United States Patent [19]
Thompson et al.

[11] 3,715,811
[45] Feb. 13, 1973

[54] REMEDIAL BRANCHING TEACHING SYSTEM

[75] Inventors: Francis T. Thompson, Murrysville; Shan C. Sun, Pittsburgh, both of Pa.

[73] Assignee: Westinghouse Electric Corporation, Pittsburgh, Pa.

[22] Filed: Oct. 13, 1970

[21] Appl. No.: 80,359

[52] U.S. Cl. ........................................35/48, 35/9 A
[51] Int. Cl. ..............................................G09b 7/04
[58] Field of Search ......................35/9 A, 9 B, 48 R

[56] References Cited

UNITED STATES PATENTS

| | | | |
|---|---|---|---|
| 3,141,243 | 7/1964 | Chapman et al. | 35/9 A |
| 3,408,749 | 11/1968 | Brudner | 35/9 A |
| 3,501,851 | 3/1970 | Price, Jr. et al. | 35/9 A |
| 3,504,447 | 4/1970 | Brudner | 35/9 B |
| 3,504,446 | 4/1970 | Brunell et al. | 35/9 B |
| 3,577,657 | 5/1971 | Plumly et al. | 35/48 R |

Primary Examiner—Robert W. Michell
Assistant Examiner—J. H. Wolff
Attorney—F. H. Henson, A. S. Oddi and C. F. Renz

[57] ABSTRACT

A system for interpreting input responses, such as student answers, and effecting appropriate output responses wherein the system is operative in a plurality of modes for interpreting input responses, for example, as correct, incorrect, or nearly correct, with the appropriate output response being effected so that a student progresses through programmed instructional material according to answers given at various points in the instructional material either in a primary or remedial manner.

15 Claims, 10 Drawing Figures

INVENTORS
Francis T. Thompson &
Shan C. Sun.
BY

ATTORNEY

REMEDIAL BRANCHING TEACHING SYSTEM

CROSS REFERENCE TO RELATED APPLICATIONS

This application is related to application Ser. No. 80360 by Francis T. Thompson entitled "Dual Answer Teaching Mode System" filed concurrently herewith and assigned to the same assignee.

BACKGROUND OF THE INVENTION

1. Field of the Invention

The present invention relates to teaching systems and, more particularly, to teaching systems for interpreting input responses and effecting appropriate output responses for controlling the manner of presenting instructional material.

2. Discussion of the Prior Art

A remedial branching type of teaching system is taught in U.S. Pat. No. 3,408,749 by H. J. Brudner wherein an audio-visual film format is employed. In this system a plurality of picture track comprising a number of frames are provided on the film with each picture track having a corresponding audio track and code track including control and correct answer information encoded thereon. A student is presented with a primary audio-visual teaching sequence and asked a question (or questions) at the end of this sequence with the film being stopped at the question asking frame of the sequence. The student then enters his answer to the question with his answer being compared with the correct answer information encoded on the film and stored in the teaching system. If the student's answer is interpreted to be correct according to the answering mode of the system, the film is advanced to the next primary teaching sequence. However, if the student's answer is interpreted as being incorrect the film is indexed to a remedial track wherein the student is presented with material intended to enable him to answer the previously incorrectly answered question. After the remedial sequence the original primary sequence may again be presented with the student again having an opportunity to answer the original question. If the student then answers the question correctly he may then proceed to the next primary teaching sequence.

In the cross-referenced copending application a dual mode answering system is described wherein student answers may be compared with stored correct answer information according to two different answering modes, namely, a commutative mode and a non-commutative mode. In the commutative mode the order of student entry is unimportant. The student answer AB is equivalent to the answer BA and both are considered identical for this answer mode. The non-commutative mode requires an exact correspondence between the stored correct answer and the student response character for character in the correct order. In both answering modes a correct or incorrect interpretation is given to the student response. Particularly in the commutative mode considerable ambiguity may exist as to whether the student response is clearly correct or clearly incorrect. This ambiguity may be minimized somewhat by requiring that the student provide the correct number of character entries for his answer to be interpreted as correct such as taught in U.S. Pat. No. 3,504,39

However, in addition to providing operation in the commutative and non-commutative modes, it would be highly desirable if student answers could be interpreted according to a variety of criteria designated to select an appropriate primary or remedial teaching branch sequence for the student. Additionally, it would be advantageous if separate output responses were given for student entries interpreted to be correct or incorrect or partially correct. According to such an answer interpreting scheme a large degree of flexibility would be provided wherein multiple primary and remedial teaching branches may be selected in accordance with the student answer so as to enhance the student's learning process. Students would thus be enabled to progress through a teaching format as presented on a multitrack film in a wide variety of branching routes varying from student to student with various students selecting various branches of instructional sequences according to their individualized responses to the instructional material.

SUMMARY OF THE INVENTION

Broadly, the present invention provides a remedial branching type of teaching system wherein input responses are interpreted according to the particular mode of operation and output responses are effected accordingly.

DESCRIPTION OF THE PREFERRED EMBODIMENT

Figure 1:
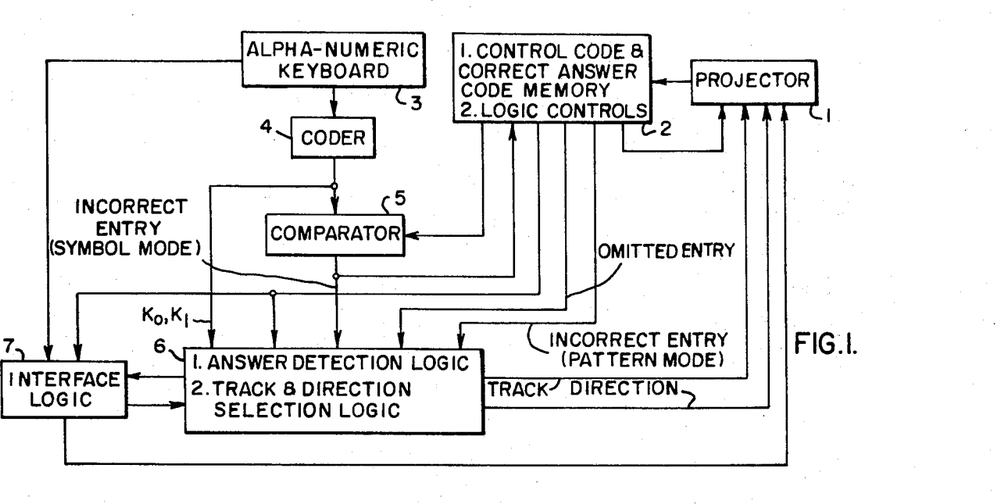
FIG. 1 is a simplified function block diagram of the teaching system embodying the present invention.
Figure 2:
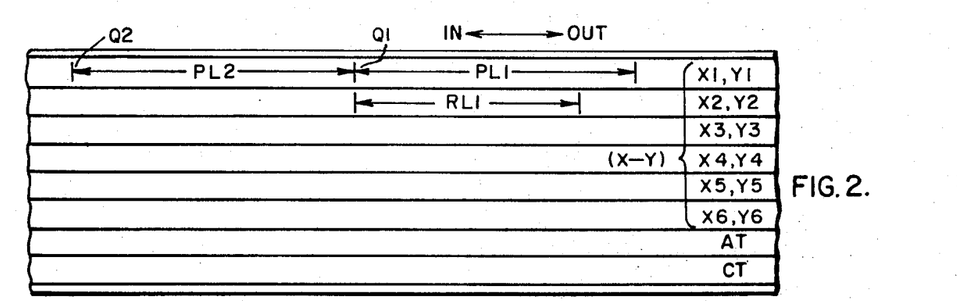
FIG. 2 is a schematic representation of a multitrack film as employed herein.

Referring to FIG. 1 a simplified functional block diagram of the present teaching system is shown. This system includes a projector 1 operative with a multitrack film such as schematically represented in FIG. 2. The film of FIG. 2 is shown to include six picture tracks cumulatively designated X–Y; six audio tracks AT correlated respectively to the six picture tracks X–Y; and six code tracks CT correlated respectively with the picture and audio tracks. The film may conveniently be disposed within a film cartridge with the film capable of traveling in both directions, that is, out of (OUT direction) and into (IN direction) the cartridge.

The projector 1 is operative with the film to present the audio and visual information contained in the respective tracks thereof in either of the designated OUT or IN directions under the control of the coded information on the code track and the various logic circuits as designated in FIG. 1. The control tracks CT respectively include control information in the form of serial binary bits which establish various operating modes within the system of FIG. 1. Also included in the respective control tracks is correct answer information in the form of serial binary bits which is to be stored in the functional block 2 of FIG. 1 in a manner according to the mode of operation selected by the coded control information.

In a typical sequence of operation assume that the projector 1 is operating on picture track PT1 of FIG. 2 and the corresponding audio and control tracks and the film is being driven in the OUT direction so that a primary teaching sequence PL1 from track X1, Y1 is being presented.

The functional block 2 includes a control code and a correct answer code memory and logic controls and is responsive to the code track corresponding to the picture track X1, Y1 under consideration. Information included on the control track defines the particular answering mode to be employed for the lesson sequence under consideration. In the copending cross-referenced application a dual mode answer system is disclosed capable of use in the functional block 2 which permits operation in the commutative mode (hereinafter the PATTERN mode) and the non-commutative mode (hereinafter the SYMBOL mode). The particular implementation of the block 2 is fully described in the copending application and the significance of the PATTERN and SYMBOL modes will be discussed in further detail.

Addition to establishing the answering mode in the functional block 2, the control information includes correct answer information for the particular teaching sequence which is stored in the correct answer code memory portion of the functional block 2 according to either the PATTERN or SYMBOL mode of answering.

When the lesson sequence PL1 reaches the last frame thereof Q1 (defined as the question frame) the projector 1 is stopped under the feedback control from the functional block 2 to the projector 1 in response to coded information designating the question frame. A question (or questions) is presented to the student and the display maintained. The student response entry to the question is entered via an alpha-numeric keyboard 3.

Figure 3:
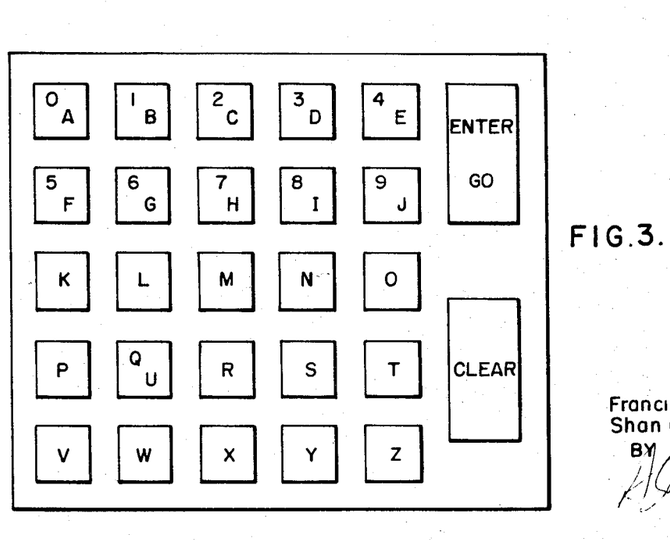
FIG. 3 is a representation of an alpha-numeric keyboard arrangement used herein.

The alpha-numeric keyboard 3 may have a configuration such as shown in FIG. 3 comprising a five by five matrix of characters. With such a keyboard 25 individual entries may be made by a student. However, this corresponds to a total of 35 characters due to duplications on 10 of the keys.

Once the student has completed his response he may either enter his answer for comparison with the stored correct answer in the functional block 2 by depressing the ENTER/GO button or may depress the CLEAR button which causes his entry to be cleared so that he may answer the question again according to his satisfaction. When the student depresses the ENTER/GO button the output of alpha-numeric keyboard 3 is applied to a coder 4 wherein the student entry is coded to a binary form suitable to be applied to a comparator 5. In the comparator 5 the student entry is compared with the correct answer information stored in the functional block 2 according to the SYMBOL or PATTERN mode selected for the lesson sequence.

The compared output of the comparator 5 is applied to functional block 2 and to a functional block 6 which comprises the subject matter of the present invention and functionally includes answer detecting logic, and track and direction selection logic. The inputs to the functional block 6 in addition to the comparator 5 are a control input from the functional block 2 an "incorrect entry" (PATTERN mode) input and an "omitted entry" input from functional block 2 and an "incorrect entry" (SYMBOL mode) input from coder 4. The manner in which the functional block 6 operates in response to various inputs will be discussed below with reference to FIG. 4.

According to the inputs to the functional block 6 the particular track of the film is selected and also the IN or OUT direction of that track is also selected. These track and direction inputs are provided to the projector 1 to establish which track will next be presented in the particular selected direction. An interface logic 7 is also provided which receives an input from the alpha-numeric keyboard 3 and also from the functional block 2 and in response thereto provides an input to the projector 1 to energize the projector 1 to proceed to the next lesson sequence as defined by the track and direction output of the functional block 6.

If, for example, the student entry was incorrect the track output of the functional block 6 may define the track X2, Y2 providing the remedial lesson RL1. The direction defined for this track would be in the IN direction. The projector 1 would thus be indexed to this track and established to be driven in the defined IN direction. Remedial track RL1 would then be displayed by the projector 1 with corresponding audio from the audio track under the control of the corresponding control track. At the end of the remedial track RL1 the projector may index to the beginning of the primary lesson PL1 which would be replayed and the same question in the question frame Q1 presented for the student to again attempt to answer. An answer interpreted as being correct would result in the film being advanced in the OUT direction to a second primary lesson PL2 on the track X1, Y1 until the question frame Q2 was reached when the projector 1 would be stopped for the presentation of a question (or questions) to the student for his answer. The system would similarly function in subsequent cycles so that according to the student response various branches of the film format would be selected with appropriate teaching material being presented to the student in accordance with his responses.

PREDEFINED MODES OF OPERATION

Before proceeding with the detailed discussion of FIGS. 4-10 it is necessary to define various operational conditions within the overall framework of the system of FIG. 1 for operation in the SYMBOL and PAT- TERN modes. The manner in which the SYMBOL and PATTERN modes are effected within the functional block 2 is fully described in the cross-indexed copending application and reference is made thereto. The following correct response requirements, answer categories and projector responses are defined with reference to the system of FIG. 1 established for operation in either the SYMBOL or the PATTERN mode and with the respective sub-modes of operation being specifically set out.

I. SYMBOL MODE — NON-COMMUTATIVE
  a. Correct Response Requirements
    The characters sequentially entered by the student as his answer must be in the correct sequence and the correct number of entries must be made.
  b. Answer Categories
    A student answer is either categorized as correct or incorrect. The capability of distinguishing between different types of incorrect answers is not required.
  c. System Responses
    If a student answer is correct, the system will proceed with the film being driven in the same direction as the previous lesson on the same track. If the answer is incorrect, the system will index the film to a remedial track ($x = 1, 2, 3...$) as specified by the code on the code track and will proceed in the remedial direction as specified by the code.

II. PATTERN MODE — COMMUTATIVE
  a. Correct Response Requirements
    The individual character inputs of the student response may be entered in any sequence. However, the student entry must include the same number of characters as the correct answer.
  b. Answer Categories
    1. Completely correct
      All of the characters specified in a correct answer are entered by the student the correct number of times.
    2. Nearly correct — no incorrect entries and acceptable omissions.
      No incorrect entry was made by the student but not greater than a specified number of correct entries were omitted. By specifying that no omitted entries will be acceptable this type of response may be deleted which is equivalent to requiring a completely correct response as in (II (b) (1)).
    3. No incorrect entries and not acceptable omissions.
      No incorrect entry was made but a greater than the specified number of correct entries were omitted.
    4. Incorrect entry
      One or more incorrect entries were made by the student.
    5. Allowable number or errors with equal treatment of errors and omissions.
      This is a special case used only in the single remedial track mode as defined below in (II (c) (2)).
  c. Projector Responses
    1. Completely correct
      If the answer is completely correct the projector will proceed in the same direction as the previous lesson on the same track.
    2. Single remedial track mode
      a. Partially correct with omissions but no incorrect entries
        1. Answer nearly correct (II (b) (2)) — the projector will proceed to remedial track X in direction specified for nearly correct answers.
        2. Answer incorrect (II (b) (4)) or the acceptable number of omissions is exceeded (II (b) (3)) the projector will proceed to a remedial track X in a direction specified for incorrect answers.
      b. Partially correct with either omissions or incorrect entries.
        1. Number of allowable omissions and incorrect entries not exceeded — the projector will proceed to remedial track X in a direction specified for nearly correct answers.
        2. Allowable number of errors exceeded — the projector will proceed to remedial track X in a direction specified for incorrect answers.
    3. Multiple remedial track mode
      a. Nearly correct answer (II (b) (2)) — the projector will proceed to remedial track X in a direction specified for nearly correct answers.
      b. No incorrect entry but acceptable number of omissions exceeded — the projector will proceed to remedial track X in a direction specified for incorrect answers.
      c. Incorrect entries made — the projector will proceed to a remedial track determined by the following factors:
        1. The group to which the first incorrect entry belongs as defined by Table I:

TABLE I

INCORRECT ENTRY GROUPS

| Group I | incorrect entry | A/0 | E/4 | I/8 | M | $Q_u$ | V | Z |
| Group II | incorrect entry | B/1 | F/5 | J/9 | N | | R | W |
| Group III | incorrect entry | C/2 | G/6 | K | O | | S | X |
| Group IV | incorrect entry | D/3 | H/7 | L | P | | T | Y |

2. The specified remedial track X as encoded on the control track of the film.
        3. The operation according to the pair or quad track mode (see II (c) (3) (d) and (e) below).
      d. Pair track mode
        1. The remedial direction is defined by the first incorrect entry.
        2. The remedial choices are the IN or OUT direction on each of two tracks.
      e. Quad track mode
        1. The remedial direction follows the specified incorrect answer direction.
        2. The remedial choices are the incorrect answer direction on each of four tracks.

III. LOGIC ASSIGNMENTS
  The complete logic assignments for the remedial track and direction suitable for both six and 12 track systems are found in Table II.

IV. CONTROL CODES
  For both six and 12 track systems a total of 14 binary

TABLE II.—REMEDIAL TRACK AND DIRECTION ASSIGNMENTS—MULTIPLE REMEDIAL TRACK MODE

| $x_3$ | $x_2$ | Group | $k_1$ | $k_0$ | Quad mode* | | | | | Pair mode | | | | | Direction |
|---|---|---|---|---|---|---|---|---|---|---|---|---|---|---|---|
| | | | | | Track Y | $y_3$ | $y_2$ | $y_1$ | $y_0$ | Track Y | $y_3$ | $y_2$ | $y_1$ | $y_0$ | |
| 0 | 0 | I | 0 | 0 | 4 | 0 | 1 | 0 | 0 | 2 | 0 | 0 | 1 | 0 | OUT. |
| 0 | 0 | II | 0 | 1 | 1 | 0 | 0 | 0 | 1 | 1 | 0 | 0 | 0 | 1 | OUT. |
| 0 | 0 | III | 1 | 0 | 2 | 0 | 0 | 1 | 0 | 2 | 0 | 0 | 1 | 0 | IN. |
| 0 | 0 | IV | 1 | 1 | 3 | 0 | 0 | 1 | 1 | 1 | 0 | 0 | 0 | 1 | IN. |
| 0 | 1 | I | 0 | 0 | 4 | 0 | 1 | 0 | 0 | 4 | 0 | 1 | 0 | 0 | OUT. |
| 0 | 1 | II | 0 | 1 | 5 | 0 | 1 | 0 | 1 | 5 | 0 | 1 | 0 | 1 | OUT. |
| 0 | 1 | III | 1 | 0 | 6 | 0 | 1 | 1 | 0 | 4 | 0 | 1 | 0 | 0 | IN. |
| 0 | 1 | IV | 1 | 1 | 3 | 0 | 0 | 1 | 1 | 5 | 0 | 1 | 0 | 1 | IN. |
| 1 | 0 | I | 0 | 0 | 12 | 1 | 1 | 0 | 0 | 10 | 1 | 0 | 1 | 0 | OUT. |
| 1 | 0 | II | 0 | 1 | 9 | 1 | 0 | 0 | 1 | 9 | 1 | 0 | 0 | 1 | OUT. |
| 1 | 0 | III | 1 | 0 | 10 | 1 | 0 | 1 | 0 | 10 | 1 | 0 | 1 | 0 | IN. |
| 1 | 0 | IV | 1 | 1 | 11 | 1 | 0 | 1 | 1 | 9 | 1 | 0 | 0 | 1 | IN. |

*In the Quad Mode, the remedial direction is either IN or OUT as specified by BIT 2 (the incorrect answer direction bit).

control bits are required to perform the various operation as defined in section II above. These 14 binary control bits and their functions are listed in Table III. Table IV defines the code by which the various remedial operations in the pattern mode are identified.

V. KEYBOARD CODES

The alpha numeric keyboard as shown in FIG. 3 shows a five bit binary code for each entry identification with the coding being performed in the functional block 4 of FIG. 1. The keyboard code is defined in Table V along with various examples.

TABLE V.—KEYBOARD CODE

| | | | | | | $k_4$ | | | | |
|---|---|---|---|---|---|---|---|---|---|---|
| | | | | $k_3$ | | | | $k_3$ | | |
| | | | $k_2$ | | $k_2$ | | $k_2$ | | | |
| $k_0$ | | A/0 | E/4 | I/8 | M | $Q_u$ | V | Z | Group | $k_1$ $k_0$ | |
| | | B/1 | F/5 | J/9 | N | R | W | | I | 0 0 | |
| $k_0$ | $k_1$ | C/2 | G/6 | K | O | S | X | | II | 0 1 | See Table I. |
| | | D/3 | H/7 | L | P | T | Y | | III | 1 0 | |
| | | | | | | | | | IV | 1 1 | |

Where:
$k_0 = 2^0$
$k_1 = 2^1$
$k_2 = 2^2$
$k_3 = 2^3$
$k_4 = 2^4$

Examples:

| | $k_4$ | $k_3$ | $k_2$ | $k_1$ | $k_0$ |
|---|---|---|---|---|---|
| A/0 | 0 | 0 | 0 | 0 | 0 |
| D/3 | 0 | 0 | 0 | 1 | 1 |
| k | 0 | 1 | 0 | 1 | 0 |
| Z | 1 | 1 | 0 | 0 | 0 |

TABLE III.—CONTROL CODES

| Bit | Assignment | Function |
|---|---|---|
| BIT 1 | 0 | Symbol mode defined. |
| | 1 | Pattern mode defined. |
| BIT 2 | 1 (IN) | Remedial direction specified for incorrect answers. Used in both symbol and pattern modes. |
| | 0 (OUT) | |
| BIT 3 $2^0$ | * | Binary codes for a certain decimal number, used in conjunction with BIT 7. In the entry-counting mode, Group N represents the correct number of entries, while in the allowable omission mode it represents the number of entry omissions allowed. |
| BIT 4 $2^1$ | * | Group N. |
| BIT 5 $2^2$ | * | |
| BIT 6 $2^3$ | * | |
| BIT 7 | 1 | Entry—counting mode defined. |
| | 0 | Allowable omission mode defined. Used only in Pattern mode. |
| BIT 8 | 1 | Multiple remedial track mode defined. Used only in Pattern mode. |
| | 0 | Single remedial track mode defined. Used only in Pattern mode. |
| BIT 9 | * | Multiple remedial control bit, used in conjunction with BIT 8 (see table IV). |
| BIT 10 | 1 (IN) | Remedial direction specification for nearly correct answers. Used only in Pattern mode. |
| | 0 (OUT) | |
| BIT 11 $2^0 = x_0$ | * | Binary number specified for remedial track assignments. The $2^3$ bit is used only in the 12-track system. |
| BIT 12 $2^1 = x_1$ | * | Track X |
| BIT 13 $2^2 = x_2$ | * | |
| BIT 14 $2^3 = x_3$ | * | |

TABLE IV

REMEDIAL MODE CODE

| Bit 8 | Bit 9 | Remedial Mode |
|---|---|---|
| 0 | 0 | Single remedial track mode—special case (II (b) (5)). |
| 0 | 1 | Single remedial track mode. |
| 1 | 0 | Quad remedial track mode. |
| 1 | 1 | Pair remedial track mode. |

Figure 4:
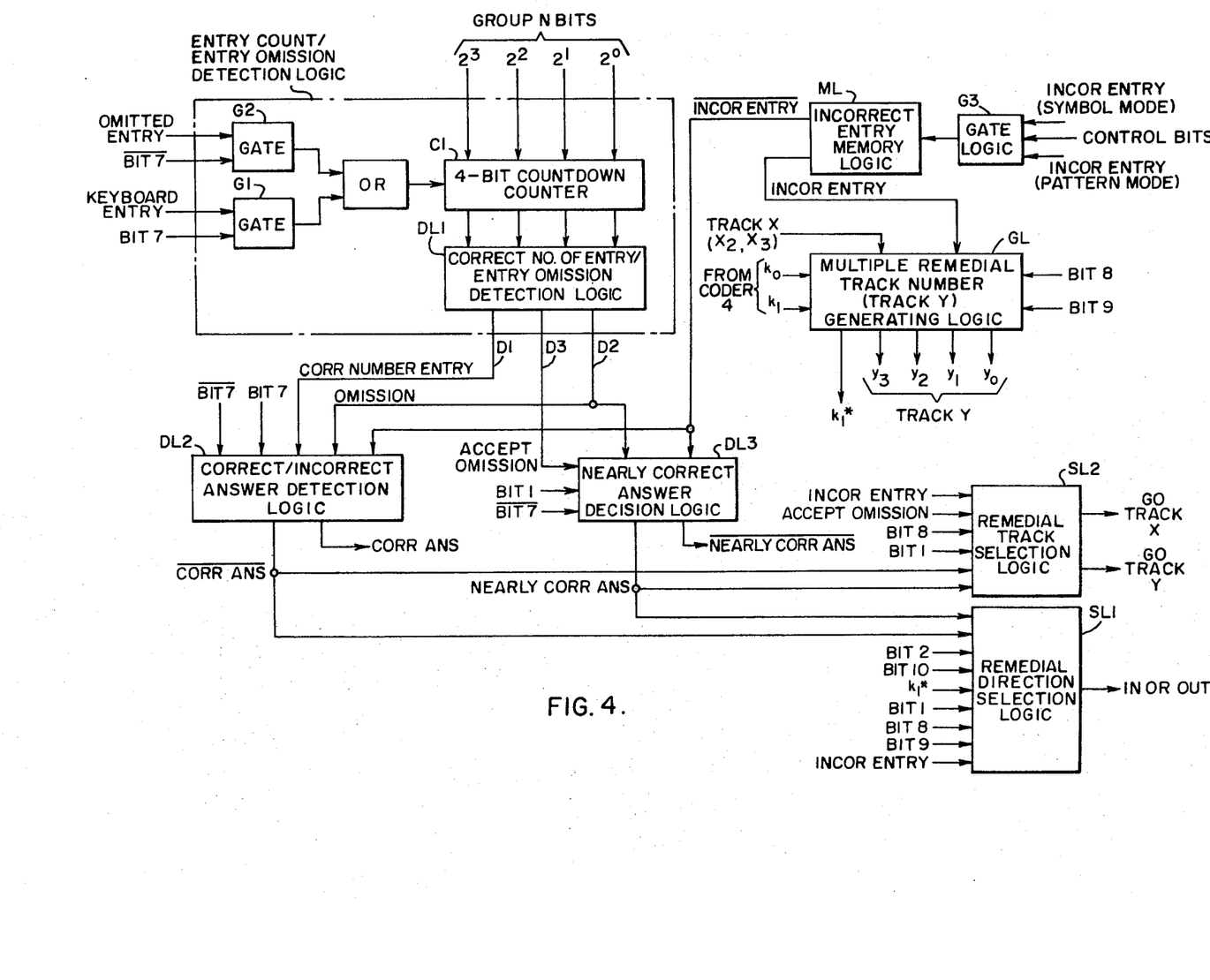
FIG. 4 is a functional block diagram of the system of the present invention.

FUNCTIONAL BLOCK DIAGRAM — FIG. 4

FIG. 4 shows a more detailed functional block breakdown of the answer detection logic, track and direction selection logic of the functional block 6 of FIG. 1. FIG. 4 will be discussed with reference to the previously defined operational modes and the relevant logic circuits shown in FIGS. 5–10 respectively.

A. ENTRY COUNT/ENTRY OMISSION DETECTION LOGIC

1. Entry counting mode.

This mode of operation is defined by the BIT 7 being a binary ONE. The BIT 7 is applied to a gate G1 thereby rendering the gate responsive to the keyboard entry supplied as the other input thereto. The keyboard entry input supplies, for example, a binary ONE for each operation of the keyboard of FIG. 3. Hence, the gate G1 provides an output ONE for each student entry to an OR logic circuit. A second gate G2 receives a $\overline{BIT}$ 7 input which blocks gate G2 from supplying an input to the OR logic circuit.

In the entry counting mode of operation the output of the OR circuit is thus a series of binary ONE's corresponding to the number of student entries. The output of the OR is applied to a four BIT countdown counter C1. Stored in the countdown counter C1 is the binary number corresponding to the correct number of entries for the particular answer under consideration. The correct number is supplied to the countdown counter C1 from the group N BITS defined in Table III as the BITs 3, 4, 5 and 6. Accordingly, prior to a student entry the four bit countdown counter C1 has stored therein a binary number corresponding to the correct number of entries of the answer. In response to each student entry the countdown counter C1 counts down by one count. If the student enters the correct number of character entries via the keyboard, at the end of this answer, when he depresses the ENTER/GO button, the countdown counter C1 will have counted down to a zero number, that is, a binary ZERO will appear at each of its four outputs to be applied to the entry count/entry omission detection logic DL1.

If the correct number of student entries has been entered corresponding to the output of the countdown counter C1 being all ZEROs the detection logic DL1 will provide a binary ONE output at the output D1 thereof. However, if an incorrect number of student entries had been made with the countdown counter C1 having an output different than all ZEROs, the output D1 of the detection logic DL1 would be a ZERO. The output D1 is defined herein as CORR NUMBER ENTRY. Thus, if CORR NUMBER ENTRY is a ONE this defines the correct number of entries by the student and if a ZERO this defines an incorrect number of student entries. The entry counting mode may be employed in both the SYMBOL and the PATTERN modes of operation.

2. Allowable omission mode.

This mode of operation is established by BIT 7 being a ZERO (see Table III). However, this mode may be used only in the PATTERN mode of operation. With the BIT 7 being a ZERO, $\overline{BIT\ 7}$ input to the gate G2 permits this gate to output the other input thereto, namely, the omitted entry input, to the OR circuit. The omitted entry input is supplied from the functional block 2 of FIG. 1. As fully discussed in the above cited copending application, when operative in the PATTERN mode, if no correct entries have been omitted, the omitted entry will be all binary ZEROs. If however, one or more correct entries have been omitted, this will produce a binary ONE output corresponding thereto. Thus, the input supplied to the countdown counter C1 will correspond to the number of omitted entries made by the student in response to a particular question.

With the allowable omission mode being defined, the group N bits inputted to the four bit countdown counter C1 will indicate the number of allowable entry omissions. For each omitted entry input the countdown counter C1 will count down by ONE. After the student has entered his complete answer the detection logic DL2 supplies the following outputs:

D2 = ONE if one or more correct entries omitted.
D2 = ZERO if all correct entries entered.
D3 = ONE if the number of allowable not exceeded.
D3 = ZERO if the allowable number of omissions exceeded.

The outputs D1, D2 and D3 of the correct number of entry/omission detection logic DL1 is employed within the system of FIG. 4 as will be described in further detail.

B. INCORRECT ENTRY MEMORY LOGIC

Incorrect entries for the PATTERN answering mode are generated in the functional block 2 and in the SYMBOL mode are generated at the output of the comparator 5 as described in the above cited copending application. In FIG. 4 the incorrect entry in both the SYMBOL and PATTERN mode in a mutually exclusive manner are applied to a logic gate G3 along with various control BITs. The outputs of the incorrect memory ML are INCOR ENTRY (which is a ONE if there is an incorrect entry and a ZERO if no incorrect entries) and the complement thereof $\overline{INCOR\ ENTRY}$. The output of the gate G3 is applied to an incorrect entry memory logic ML which is operative to store therein any incorrect entry made.

Figure 5:
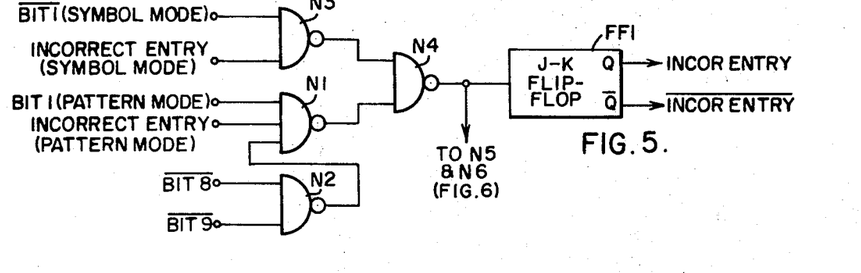
FIG. 5 is a logic block diagram of the incorrect entry memory function block ML of FIG. 4.

FIG. 5 shows a breakdown of the logic gate G3 and the memory logic ML. The incorrect entry memory circuit of FIG. 5 is operative to store in a JK flip-flop FF1 there of that an incorrect entry has been made. In all operational modes except the "special case" (defined at II (b) (5) in the outline above). Accordingly, in the defined "special case," a NAND N1 of FIG. 5 is blocked by a ZERO input being provided thereto from an N2 which receives the inputs $\overline{BIT\ 8}$ and $\overline{BIT\ 9}$. In the single remedial track mode "special case," the BITs 8 and 9 as defined in Table IV are both ZEROs. In all other modes of operation (as shown by Table IV) the NAND N2 will output a ONE to the NAND N1 so as to enable this gate. The other inputs to the NAND N1 are the BIT 1, which when in the PATTERN mode is a ONE and when in the SYMBOL mode is a ZERO and also the incorrect entry for the PATTERN mode. Therefore, in all but the "special case," specified above, the NAND N1 will output a ZERO for each incorrect entry. A NAND gate N3 receives $\overline{BIT\ 1}$ as one input and the incorrect entry in the SYMBOL mode as the other entry. Accordingly, in the SYMBOL mode of operation, for each incorrect entry the NAND N3 will output a ZERO. Since $\overline{BIT\ 1}$ is a ONE during the SYMBOL mode there will be thus provided, a ONE for each incorrect entry in either the PATTERN or SYMBOL mode which will be stored in the JK flip-flop FF1. The flip-flop FF1 has two outputs: INCOR ENTRY and $\overline{INCOR\ ENTRY}$, with the INCOR ENTRY being defined as a ONE if an incorrect entry is made or a ZERO if no incorrect made or incorrect entries ignored. In the "special case" when the NAND gate N1 is disabled every incorrect entry will be treated as an omitted correct entry, which will be taken into count in detection logic DL1 as discussed in A above.

C. MULTIPLE REMEDIAL TRACK NUMBER (TRACK Y) GENERATING LOGIC

In FIG. 4 the multiple remedial track number generating logic GL is shown which receives the INCOR ENTRY from the incorrect entry memory ML as a ONE if incorrect entries or a ZERO if no incorrect entries. The multiple remedial track number generating logic GL functions on the basis of the rules established in Section II (c) (3) C (see also Tables I, II and V) above wherein a group of binary bits designated herein as track Y are generated. The generating logic GL receives BIT 8 and BIT 9 for defining the multiple remedial track mode according to Table IV; the two least significant bits $k_0$ and $k_1$ of the student entry from the coder 4 of FIG. 1 of the first incorrect student entry; INCOR ENTRY; and the higher the bit $x_2$ for the six track system and the bits $x_2$ and $x_3$ for the 12 track system as provided on the control track of the film as BIT 13 and BIT 14. The output of the multiple remedial tracks number generating logic GL are the four bits $y_0$, $y_1$, $y_2$ and $y_3$ defining the Y track and also an output $k_1^*$.

Figure 6:
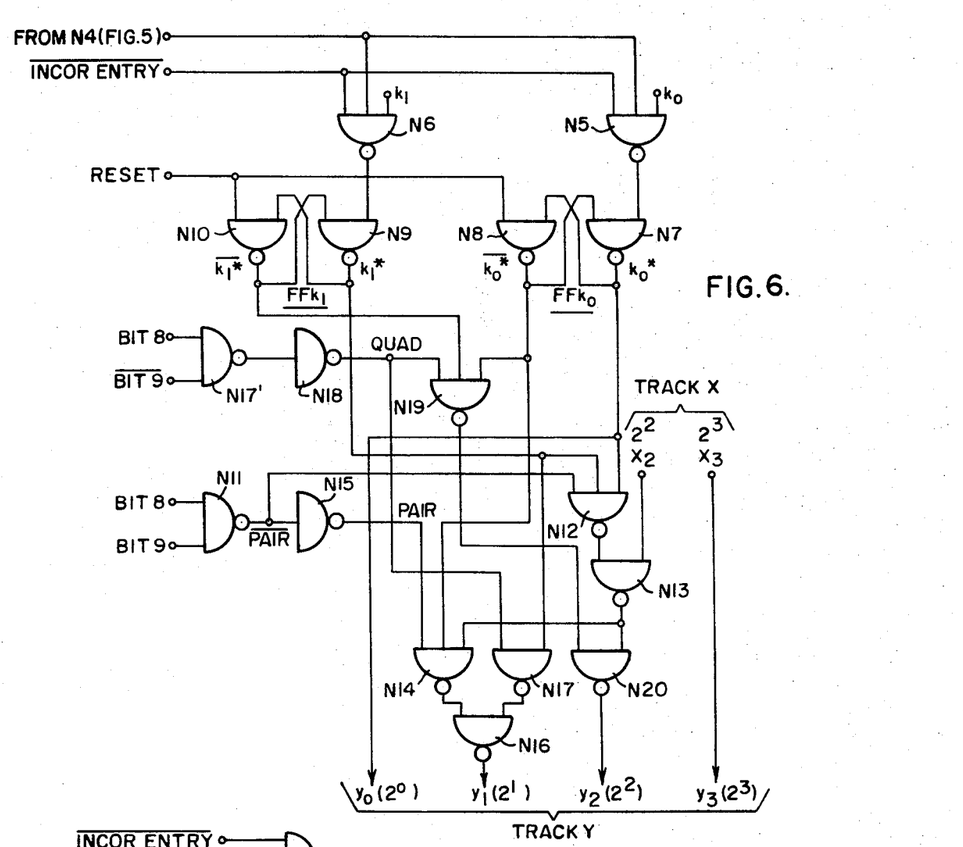
FIG. 6 is a logic block diagram of the multiple medial track number generating logic functional block GL of FIG. 4.

FIG. 6 shows the detailed logic circuitry for the generating logic GL. This logic diagram will be discussed with reference to the logical equations defining the generation of each of the bits $y_0$, $y_1$, $y_2$ and $y_3$ of the Y track output.

(1) $y_0$ bit generation

The equation:

$$y_0 = k_0^* \quad (1)$$

defines the generation of the first bit $y_0$ both the pair (II (3) (c) a) and the quad (II (c) (3) b) modes. The asterisk (*) indicates that the logic state of the $k_0$ and $k_1$ bits have to be stored in flip-flops FF$k_0$ and FF$k_1$ of FIG. 6.

The bit $k_0$ is applied as an input to a NAND N5 and the bit $k_1$ is applied to NAND N6. The other two inputs to both NANDS N5 and N6 are the output from the NAND N4 of FIG. 5 and the INCOR ENTRY output of the flip-flop FF1 of FIG. 5. When an incorrect entry is made by the student the first bit $k_0$ will be stored in the flip-flop FF$k_0$ comprising NAND gates N7 and N8 to provide a stored output $k_0^*$ and the complement $\overline{k_0^*}$ thereof. Similarly the second bit $k_1$ will be stored in the flip-flop FF$k_1$ which includes NANDS N9 and N10 to provide the stored second bit output $k_1^*$ and the complement $\overline{k_1^*}$. The output of the NAND N7 defines the bit $k_0^*$ thus establishes directly the first bit $y_0$ of the track Y output in both the quad and pair modes.

(2) $y_1$ bit generation

The logical equation in the pair mode for the generation of the $y_1$ bit is:

$$y_1 = \overline{k_0^*} \; \overline{x_2}$$

In the quad mode the logical equation is:

$$y_1 = k_1^*$$

The overall equation may then be defined as:

$$y_1 = \overline{k_0^*} \; \overline{x_2} \cdot \text{PAIR} + k_1^* \cdot \text{QUAD} \quad (2)$$

where, $$\text{PAIR} = \text{BIT 8} \cdot \text{BIT 9}$$

$$\text{QUAD} = \text{BIT 8} \cdot \overline{\text{BIT 9}} \quad (3)$$

According to Table IV the PAIR mode is defined by BITs 8 and 9 being both binary ONEs. BITs 8 and 9 are applied to a NAND gate N11 which applies a $\overline{\text{PAIR}}$ output, which is applied to a NAND N12 that also receives the $k_0^*$ and the $k_1^*$ as inputs. The output of the NAND N12 is applied to a NAND N13 which also receives the $x_2$ bit (BIT 13). The output of the NAND N13 is applied to a NAND N14 which receives the PAIR output of an inverting NAND N15 which receives the $\overline{\text{PAIR}}$ output of the NAND N11. The other input of the NAND N14 is the $\overline{k_0^*}$ output of the NAND N8. The output of the NAND N14 is applied to a NAND N16. The other input to the NAND N16 is the output of a NAND N17 which receives the $k_1^*$ output of the NAND N9 and a QUAD output which would be a ZERO in the pair mode.

Accordingly, the output of the NAND N16 satisfies the equation (2) in the pair mode so that the second bit $y_1 = \overline{k_0^*} \; \overline{x_2} \cdot \text{PAIR}$ as required for the pair mode of operation.

In the quad mode of operation BIT 8 is a ONE and BIT 9 is a ZERO. Thus in this mode of operation a NAND N17' receiving inputs BIT 8 and $\overline{\text{BIT 9}}$ supplies its output to a NAND gate N18 which in response thereto provides the QUAD output. The QUAD output is applied to the NAND N17 which supplies the input to the NAND N16 for generating the $y_1$ bit. Accordingly, in the quad mode of operation the equation $y_1 = k_1^* \cdot \text{QUAD}$ is satisfied, with the other input to the NAND gate N17 being $k_1^*$.

(3) $y_2$ bit generation

In the pair mode the $y_2$ bit is defined by the equation $y_2 = x_2$. In the quad mode the logic equation is:

$$y_2 = \overline{k_0^* \; \overline{k_1^*}} + \overline{k_0^* \; k_1^*} \cdot x_2$$

The overall equation for defining the $y_2$ bit is:

$$\begin{aligned} y_2 &= x_2 \cdot \text{PAIR} + [\overline{k_0^* \; \overline{k_1^*}} + \overline{k_0^* \; k_1^*}] \cdot x_2 \cdot \text{QUAD} \\ y_2 &= x_2 \cdot \text{PAIR} + \overline{k_0^* \cdot \overline{k_1^*}} \cdot \text{QUAD} + x_2 \cdot \overline{k_0^* \; k_1^*} \end{aligned} \quad (4)$$

In the pair mode, a ZERO quad output is applied to a NAND N19 so that the NAND N19 supplies a ONE input to a NAND N20 whose output defines the $y_2$ bit. The other input to the NAND N20 is from the NAND N13 which receives the $x_2$ input. The output of the NAND N20 is thus equal to $x_2$ to satisfy the logical equation $y_2 = x_2$ in the pair mode.

In the quad mode the term $\overline{k_0^* \cdot \overline{k_1^*}} \cdot \text{QUAD}$ is provided via the NAND N19 to the NAND N20. The term $x_2 \cdot \overline{k_0^* \; k_1^*}$ is provided via the NAND gates N12 and N13. Thus the logical output of the NAND N20 in the quad mode satisfies the logical equation for the $y_2$ bit.

(4) $y_n$ bit generation for $n$ greater or equal to 3

The logical equation defining the $y_n$ bit is:

$$y_n = x_n \quad (5)$$

where, $x_n$ is the $n$th bit in the X track code which is used only in systems where the number of tracks exceeds seven.

Table II defines the four track Y bits for the various $k_0$, $k_1$ and $x_2$, $x_3$ inputs. Note that the $k_0$, $k_1$ bits are determined by the Groups I, II, III or IV as set forth in Table I as the incorrect entry groups.

D. CORRECT/INCORRECT ANSWER DETECTION LOGIC

In FIG. 4 the correct/incorrect answer detection logic DL2 is operative to determine whether an answer is completely correct according to the following criteria:

1. no incorrect entry has been made, and
2. no correct entry has been omitted, (allowable omission mode, BIT 7 = ZERO), or the correct number of entries has been entered (entry counting mode, BIT 7 = ONE).

The correct/incorrect answer detecting logic DL2 thus receives as inputs the CORR NUMBER ENTRY D1 and the OMISSION entry D2 both from the correct number of entries/entry omission detection logic DL1; the $\overline{\text{INCOR ENTRY}}$ from incorrect entry memory ML and the BIT 7 and $\overline{\text{BIT 7}}$. In response to these entries are provided the correct answer output CORR ANS and the complement thereof $\overline{\text{CORR ANS}}$.

The logic equation which must be satisfied by the correct/incorrect answer detection logic DL2 is:

$$\text{CORR ANS} = \overline{\text{INCOR ENTRY}} \; [\overline{\text{BIT 7}} \cdot \text{OMISSION} + \text{BIT 7} \cdot (\text{CORR NUMBER ENTRY})] \quad (6)$$

where OMISSION
= ONE if one or more correct entries omitted.
= ZERO if all correct entries entered.

CORR NUMBER ENTRY

= ONE if correct number of entries entered.

= ZERO if incorrect number of entries entered.

Figure 7:
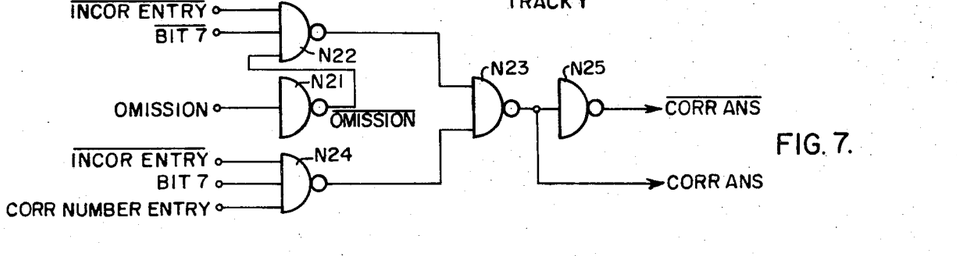
FIG. 7 is a logic block diagram of the correct/incorrect answer detecting logic functional block DL2 of FIG. 4.

FIG. 7 shows a practical implementation of the correct/incorrect answer detecting logic DL2. In FIG. 7 the omission entry D2 is applied through an inverting NAND N21 as one input to a NAND N22. The other inputs to the NAND N22 are $\overline{\text{INCOR ENTRY}}$ and $\overline{\text{BIT 7}}$. The output of the NAND N22 is applied to a NAND N23. The CORR NUMBER ENTRY is applied to a NAND N24 which also receives BIT 7 and $\overline{\text{INCOR ENTRY}}$ with the output of the NAND N24 being applied at the other input to the NAND N23. The output of the NAND N23 defines the CORR ANSWER output which will be a ONE if the answer is correct and a ZERO is incorrect. The output of the NAND N23 is also inverted in a NAND N25 to supply the complementary output $\overline{\text{CORR ANS}}$.

E. NEARLY CORRECT ANSWER DECISION LOGIC

The nearly correct answer decision logic DL3 of FIG. 4 must satisfy the following criteria for defining a nearly correct answer:

1. In the pattern mode, the allowable omission mode has been defined.

2. No incorrect entry has been made including the "-special case" that the incorrect entries have been ignored (see II (b) (5) and B above).

3. Some correct entries have been omitted but the total number of omissions is acceptable.

The nearly correct answer logic DL3 must solve the following logic equation:

$$\text{NEARLY CORR ANS} = \text{BIT 1} \cdot \overline{\text{BIT 7}} \cdot \overline{\text{INCOR ENTRY}} \cdot \text{OMISSION} \cdot \text{ACCEPT OMISSION} \quad (7)$$

where, ACCEPT OMISSION

= ONE if the number of allowable omissions not exceeded,

= ZERO if the allowable number of emissions exceeded.

As shown in FIG. 4 the inputs to the nearly correct answer decision logic DL3 are the ACCEPT OMISSION D3, OMISSION D2, $\overline{\text{INCOR ENTRY}}$ from the incorrect entry memory ML and BIT 1 and $\overline{\text{BIT 7}}$. In response to these inputs the outputs NEARLY CORR ANS and $\overline{\text{NEARLY CORR ANS}}$.

Figure 8:
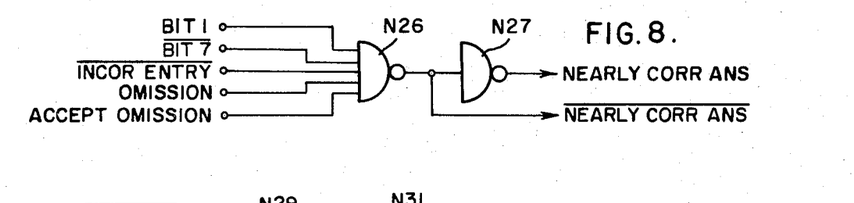
FIG. 8 is a logic block diagram of the nearly correct answer decision logic functional block DL3 of FIG. 4.

The implementation for the narly correct answer decision logic DL3 is shown in FIG. 8. All of the described inputs are applied to a NAND N26 which satisfies the complement of equation (7) above to provide the output $\overline{\text{NEARLY CORR ANS}}$. By inverting the output of the NAND N26 in a NAND N27, the NEARLY CORR ANS output is provided which is a binary ONE if nearly correct and a binary ZERO is either correct or incorrect.

F. REMEDIAL DIRECTION SELECTION LOGIC

In FIG. 4 the selection of the IN or OUT direction that the film is to be driven in response to the student entry is accomplished by the remedial direction selection logic SL1. The criteria upon which the selection logic SL1 operates are:

1. Completely correct answer direction. No change in direction; direction remains the same as preceding lesson.

2. Nearly correct answer direction. Use BIT 10, see Table III.

3. Incorrect answer directions:

a. Use BIT 2 (see Table III) for all modes except pair remedial track mode (II (c) (3) d).

b. Use $k_1^*$ (see FIG. 6) for pair remedial track mode only. ($k_1^*$ = ONE, IN direction; $k_1^*$ = ZERO, OUT direction).

The remedial direction selection logic SL1 receives the inputs as defined on FIG. 4 to provide the selected direction IN or OUT output. The remedial direction selection logic SL1 is operative to satisfy the following logic equations for the respective IN and OUT directions:

$$\text{IN} = \text{BIT 2} \cdot (\text{INCOR ANS DIR}) + \text{BIT 10} \cdot (\text{NEARLY CORR ANS}) + k_1^* (\text{PAIR DIR}) \quad (8)$$

$$\text{OUT} = \overline{\text{BIT 2}} \cdot (\text{INCOR ANS DIR}) + \overline{\text{BIT 10}} \cdot (\text{NEARLY CORR ANS}) + \overline{k_1^*} (\text{PAIR DIR}) \quad (9)$$

where $$\text{INCOR ANS DIR} = \overline{\text{CORRECT ANS}} \cdot \overline{\text{PAIR DIR}} \cdot \overline{\text{NEARLY CORR ANS}} \quad (10)$$

$$\text{PAIR DIR} = (\overline{\text{INCOR ENTRY}}) \cdot \text{BIT 1} \cdot \text{PAIR} \quad (11)$$

Figure 9:
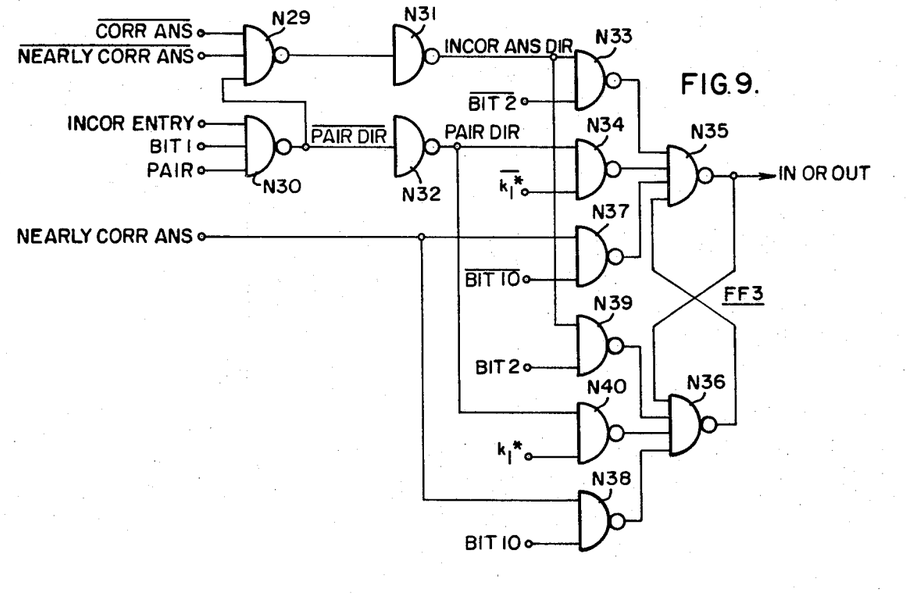
FIG. 9 is a logic block diagram of the remedial direction selection logic function block SL1 of FIG. 4.

FIG. 9 shows a practical implementation for forming the above function as defined in equations (8) and (9). In FIG. 9 the incorrect answer direction (INCOR ANS DIR) is provided as follows. $\overline{\text{CORRECT ANS}}$ and $\overline{\text{NEARLY CORR ANS}}$ inputs are provided to a NAND N29. The $\overline{\text{PAIR DIR}}$ input is applied to the NAND N29 from a NAND N30. The NAND N30 receives as inputs: INCOR ENTRY, BIT 1 and PAIR (see FIG. 6). The output of the NAND N29 is inverted in a NAND 31, whose output satisfies the conditions of equation (10) to provide INCOR ANS DIR.

If the pair mode of operation is desired the output of the NAND N30 will block the NAND N29. The output of a NAND N32 which receives the $\overline{\text{PAIR DIR}}$ as an input will thus satisfy equation (11) and provide the PAIR DIR output.

The output of NAND N31 is applied to a NAND N33 which receives at its other input $\overline{\text{BIT 2}}$. The output of NAND N32 is applied to a NAND N34 which receives as its other input $\overline{k_1^*}$. Both of the outputs of the NANDs N33 and N34 are applied to a NAND N35 of a flip-flop FF3 which includes a NAND N36. The NEARLY CORR ANSWER input is applied to a NAND N37 and a NAND N38. The NANDS N37 and N38 have as their other inputs $\overline{\text{BIT 10}}$ and BIT 10, respectively. The output of NAND N37 is applied to the NAND N35 and the output of NAND N38 is applied to the NAND N36. As defined in Table III when the BIT 10 is ONE this defines the IN direction and when the BIT 10 is a ZERO this defines the OUT direction in for nearly correct answers.

The INCOR ANS DIR output of the NAND N31 is also applied to a NAND N39 which also receives BIT 2 as the other input thereto. The PAIR DIR output of the NAND N32 is applied to a NAND N40 which receives as its other input the $k_1^*$ input. The outputs of the NANDs N39 and N40 are both applied to the NAND N36.

If any of the four inputs to the NAND N35 of the flip-flop FF3 is a ZERO, the output thereof will be a ONE defining the OUT direction. Conversely, if all of the inputs to NAND N35 should be a ONE the output will be a ZERO defining the IN direction. The logical equations defining the IN and OUT directions are set forth above as equations (8) and (9), respectively.

G. REMEDIAL TRACK SELECTION LOGIC

In FIG. 4 remedial track selection logic SL2 is provided for determining whether a remedial track is to be selected and whether track X or track Y information is to be used. The output of the remedial track selection logic SL2 is a mutually exclusive output either GO TRACK X or GO TRACK Y. The GO TRACK Y output is only used in the pattern multiple remedial track mode (II (c) (3)) when one or more incorrect entries are made.

The remedial track selection logic operates on the following factors:

1. Completely correct answer. The track number remains the same as in the preceding teaching sequence.
2. Conditions under which another track X will be selected.
   a. Symbol mode — answer incorrect (I (c)).
   b. Pattern-single remedial track mode — incorrect answer (II (b) (4)).
   c. Pattern-multiple remedial track mode — answer nearly correct (II (b) (2)).
   d. Pattern-multiple remedial track mode — no incorrect entries but allowable number of omissions exceeded (II (b) (3)).

The logic equation according to the above described factors is:

$$\text{GO TRACK X} = \overline{\text{BIT 1}} \cdot \overline{(\text{CORR ANS})} + \text{BIT 1} \cdot [\overline{\text{BIT 8} \cdot \overline{\text{CORR ANS}} + \text{BIT 8} \cdot \overline{(\text{NEARLY CORR ANS} + \overline{\text{ACCEPT OMISSION} \cdot \overline{\text{INCOR ENTRY}}})}}] = \overline{\text{CORR ANS}} \cdot (\overline{\text{BIT 1} \cdot \text{BIT 8}}) + \text{BIT 1} \cdot \text{BIT 8} \cdot \overline{\text{BIT 7}} \cdot \text{OMISSION} \cdot \overline{\text{INCOR ENTRY}} \quad (12)$$

The logical equation for selection of track Y which is used only in the pattern-multiple remedial track mode when one or more incorrect entries are made is:

$$\text{GO TRACK Y} = \text{BIT 1} \cdot \text{BIT 8} \cdot \text{INCOR ENTRY} \quad (13)$$

Figure 10:
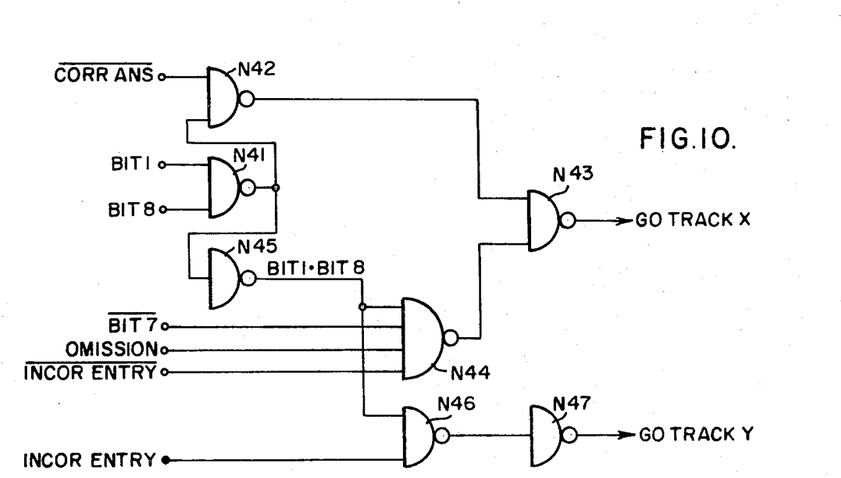
FIG. 10 is a logic block diagram of the remedial track selection logic functional block SL2 of FIG. 4.

A logic circuit for satisfying the equations (12) and (13) is shown in FIG. 10. In the symbol mode of operation BIT 1 is a ZERO; therefore, a NAND N41 of FIG. 10 will supply a ONE output to a NAND N42 which receives $\overline{\text{CORR ANS}}$ as the other input thereto. The output of the NAND N42 is applied to a NAND N43 which receives its other input from a NAND N44. The output of the NAND N41 is also applied to a NAND N45 which therefore provides a logical output BIT 1 · BIT 8. In the symbol mode the NAND N44 will thus receive a ZERO input so that the NAND N44 will supply a ONE input to the NAND N43. Accordingly, when an incorrect answer appears, a ONE will be provided from the NAND N43 as the GO track X output. The output of the NAND N45 is also applied to a NAND N46 which receives as its other input INCOR ENTRY so that in the symbol made a ONE output is supplied therefrom to a NAND N47 which outputs a ZERO as the GO track Y output.

In the pattern mode BIT 1 is a binary ONE thereby unblocking the NAND N41. The other inputs to the NAND N44 are $\overline{\text{BIT 7}}$, OMISSION and $\overline{\text{INCOR ENTRY}}$. In the single remedial track mode the NAND N46 is blocked by the application of a ZERO input thereto from BIT 8 so that the GO track Y output is a ZERO. However, in the multiple remedial track mode whenever an INCOR ENTRY is received by the NAND N46, NAND N47 will supply a ONE output defining the GO track Y condition. The GO track Y output defining the GO track Y from the NAND N43 will be a ZERO, however, since both inputs under the defined conditions will be ONEs.

In pattern multiple remedial track mode when one or more omissions occur the OMISSION input to the NAND N44 will be a ONE as will be the other inputs thereto. Thus NAND N44 will supply a ZERO output to NAND N43 causing a ONE GO track X output to be provided.

SUMMARY

In summary the present remedial branching type of teaching system is capable of operation in a plurality of modes permitting interpretation of student entries as correct, incorrect, nearly correct and others according to predefined codes. In response to student entry, moreover, the particular track primary or remedial to be presented to the student as the next searching sequence is selected as is the primary or remedial direction of presentation of that track. The logical configurations employed herein additionally, provide for highly economic use of the control codes.

What is claimed is:

1. In a system for evaluating the accuracy of a constructed response and providing remedial information as a function of the relative accuracy of the constructed response, the combination of, first means for storing individual segments of primary information, requests for a constructed response associated with said primary information, correct answer information associated with each request for a constructed response, and a plurality of segments of secondary information, second means operatively connected to said first means for reproducing said primary information and associated request for a constructed response, third means operatively connected to said first means for storing in digital form said correct answer information, fourth means for providing a constructed response to said request for constructed response reproduced by said second means, said fourth means including a plurality of actuator means, the operation of each actuator means producing a digital output signal, fifth means operatively connected to said third and fourth means for comparing the constructed response developed by the operation of said fourth means in response to said request for constructed response reproduced by said second means with the correct answer information stored in said third means, said fifth means producing a first output signal when said constructed response corresponds to said correct answer information, said first output signal indicative of a correct constructed response, said fifth means producing a second output signal indicative of an incorrect constructed response in the event the said constructed response does not correspond to said correct answer information, sixth means operatively connected to said first means and responding to the output signals of said fourth means and a second output signal of said fifth means to provide selective reproduction by said second means of secondary information determined by the digital output signal developed by a selected actuator means, the digital output signal functioning to address preselected secondary information related to said actuator means, said sixth means responding to the presence of a first output signal from said fifth means by causing a subsequent segment of primary information and a corresponding request for constructed response to be reproduced by said second means and the corresponding correct answer information to be stored in digital form in said third means and further wherein said secondary information comprises segments of remedial information, said digital output signal produced by the operation of an actuator means being a multi-bit digital word, said multi-bit digital word addressing predetermined segment or segments of said secondary information for reproduction by said second means in the event said multi-bit digital word results in the generation of a second output signal by said fifth means.

2. In a system as claimed in claim 1 wherein said first means includes a multi-track media.

3. In a system as claimed in claim 1 wherein said segments of remedial information are arranged to form at least three separate remedial responses, each multi-bit digital word addressing one of said remedial responses.

4. In a system as claimed in claim 1 wherein said constructed response is formed by the operation of more than one of said actuator means.

5. In a system for evaluating the accuracy of a constructed response, the combination of, first means for storing individual segments of primary information, requests for constructed response associated with said primary information, correct answer information comprised of a plurality of correct answers associated with each request for a constructed response, second means operatively connected to said first means for reproducing said primary information and associated request for a constructed response, third means operatively connected to said first means for storing in digital form said correct answer information, fourth means for providing a constructed response to said request for constructed response reproduced by said second means, said fourth means including a plurality of actuator means, the operation of each actuator means producing a digital input entry, fifth means adapted to operate in an allowable omission mode including sixth means for establishing a predetermined number of permissible omitted input entries and seventh means for comparing the number of input entries omitted from the correct number of entries in said second means with said predetermined number of permissible omitted input entries, and providing an acceptable omission indication that less or more than a permissible number of omitted entries have been entered.

6. The combination of claim 5 wherein:
said fifth means includes nearly correct answer detection means responsive to said acceptable omission indication and an incorrect entry indication indicative of whether an incorrect or no incorrect entry has been included in said input entries to provide a nearly correct answer indication when the acceptable number of omissions has not been exceeded and no incorrect entries have been made.

7. The combination of claim 5 wherein said fifth means is operatively connected to said first means and is adapted to operate in an entry counting mode and said allowable omission mode wherein:

said fifth means includes means for comparing the number of entries included in said input entries with the correct number of entries and providing a correct entry number indication that a correct or incorrect number of entries has been made when operative in said entry counting mode, and for comparing the number of entries omitted from the correct number of entries with the predetermined number of permissible omitted entries and providing an acceptable omission indication that less or more than a permissible number of omitted entries has been made when operative in said allowable omission mode, correct/incorrect answer detecting means responsive to said correct entry number indication and an incorrect entry indication indicative of whether an incorrect entry or no incorrect entry has been included in said input entries to provide a correct answer indication in response thereto when the correct number of entries has been entered and no incorrect entries have been entered when operative in the entry counting mode, nearly correct detection means responsive to said acceptable omission indication and an incorrect entry indication indicative of whether an incorrect entry or no incorrect entry has been included in said input entries to provide a nearly correct answer indication when the acceptable number of omissions has not been exceeded and no incorrect entry has been made when operative in said acceptable omission mode.

8. The combination of claim 7 wherein said first means includes remedial information.

9. The combination of claim 8 wherein said first means includes control information for determining the mode of operation of the system and for establishing said predetermined number of permissible omitted input entries.

10. The combination of claim 9 wherein said first means includes a multi-track media for storing said primary information, requests for constructed response, correct answer information, remedial information, and said control information.

11. The combination of claim 10 wherein:
said fifth means includes
track selection means and direction selection means responsive to said correct answer indication and said nearly correct answer indication for respectively selecting a primary or remedial track of said multi-track media and the primary or remedial direction of operation thereof according to the mode of operation defined in said system.

12. The combination of claim 11 wherein:

the information included on said multi-track media defines the following:
1. the answer mode as either commutative or non-commutative,
2. the remedial direction for incorrect input entries in either said commutative or non-commutative modes,
3. the correct number of entries when operative in said entry counting mode or the allowable number of omissions in said input entries that can be omitted in said allowable omission mode,
4. the entry counting mode or the allowable omission mode,
5. a multiple remedial track mode wherein one of several tracks may be designated as said remedial tracks or a single remedial track mode wherein only one track may be designated said remedial track,
6. said remedial direction for nearly correct answers, and
7. the remedial track;
wherein said fifth means is responsive to said control information.

13. The combination of claim 8 wherein:
said fifth means includes
means for selecting remedial information for reproduction by said second means in response to the first incorrect entry in said input entries.

14. The combination of claim 13 wherein each input entry is a multi-bit digital word, said multi-bit digital word functioning to select remedial information for reproduction by said second means.

15. In a system for evaluating the accuracy of a constructed response, the combination of,
first means for storing individual segments of primary information, requests for constructed response associated with said primary information, correct answer information comprised of a plurality of correct answers associated with each request for a constructed response,
second means operatively connected to said first means for reproducing said primary information and associated request for a constructed response,
third means operatively connected to said first means for storing in digital form said correct answer information,
fourth means for providing a constructed response to said request for constructed response reproduced by said second means, said fourth means including a plurality of actuator means, the operation of each actuator means producing a digital input entry,
fifth means operatively connected to said third and fourth means for comparing the constructed response developed by the operation of said fourth means in response to said request for constructed response reproduced by said second means with the correct answer information stored in said third means to determine the number of correct input entries,
sixth means adapted to operate in an allowable omission mode including seventh means for establishing a minimum number of correct input entries and eighth means for comparing the number of correct input entries with said minimum number of correct input entries, and providing an acceptable omission indication that less or more than said minimum number of correct input entries have been entered.

* * * * *